United States Patent [19]

Nishimura

[11] Patent Number: 4,819,913

[45] Date of Patent: Apr. 11, 1989

[54] LEVER TYPE HOISTING MACHINE

[75] Inventor: Yosaku Nishimura, Osaka, Japan

[73] Assignee: Vital Kogyo Kabushiki Kaisha, Osaka, Japan

[21] Appl. No.: 113,161

[22] Filed: Oct. 27, 1987

[30] Foreign Application Priority Data

Nov. 15, 1986 [JP] Japan ................................ 61-272413

[51] Int. Cl.[4] .......................... B66D 1/14; F16D 19/00

[52] U.S. Cl. .................................... 254/350; 254/353; 254/357

[58] Field of Search ............... 254/346, 347, 350, 351, 254/352, 353, 354, 357, 369, 348, 368; 192/16

[56] References Cited

U.S. PATENT DOCUMENTS 3,047,114 7/1962 Stevens ........................... 254/350 X
4,469,308 9/1984 Nakamura ........................... 254/350
4,471,946 9/1984 Maeda ................................ 254/350
4,474,360 10/1984 Maeda ................................ 254/350
4,479,635 10/1984 Maeda ................................ 254/350
4,483,519 11/1984 Nakamura ........................... 254/357
4,512,555 4/1985 Nakamura ....................... 254/357 X

*Primary Examiner*—Joseph J. Hail, III
*Attorney, Agent, or Firm*—Mason, Fenwick & Lawrence

[57] ABSTRACT

A lever type hoisting machine capable of easily and securely pulling down a lower hook in no-load state. An operation wheel is rotatably supported in contact with a drive shaft and a pressure drive wheel, and an inside collision part and an outside collision part are disposed at the pressure drive wheel side part of the operation wheel and at the opposite side part, respectively, while a collision wall capable of being engaged with the inside collision part is formed on the pressure drive wheel, and a collision element capable of being engaged with the outside collision part is formed in a regulating member held movably only in the axial direction on the drive shaft in contact with the opposite side of the pressure drive wheel of the operation wheel, and a secure rotation in the hoist-down direction of the pressure drive wheel in no-load state is guaranteed, so that it is possible to pull down the lower hook in continuous state.

8 Claims, 4 Drawing Sheets

LEVER TYPE HOISTING MACHINE

BACKGROUND OF THE INVENTION

1. Field of the Invention

This invention relates to a lever type hoisting machine, and more particularly to a lever type hoisting machine having a simple structure capable of securely and easily pulling down the lower hook in no-load state.

2. Description of the Prior Art

In the conventional lever type hoisting machine, generally, a pressure bearing member was fixed on a drive shaft which was coupled to the load sheave by way of a transmission gear train, and friction members were disposed at both sides, and a reverse rotation preventive wheel rotatably only in one direction was inserted, and then a pressure drive wheel was screwed in to hold the reverse rotation preventive wheel with the pressure bearing member, and the pawl of operation lever was engaged with the pressure drive wheel. In such construction, by operating the operation lever to rotate the pressure drive wheel in the hoisting-up direction, the pressure drive wheel moves to the pressure bearing member side above the drive shaft to press the reverse rotation preventive wheel firmly against the pressure bearing member, so that the lower hook of the load chain wound on the load sheave is hoisted up.

Meanwhile, when pulling down the lower hook to a specified position in no-load state, that is, without any load in the lower hook of the hoisting machine, the pressure drive wheel is moved by the operation lever in a direction to depart from the friction member to keep the pressure drive wheel cleared from the cover or other part of the operation level, and the lower hook or the load chain coupled thereto is slowly moved downward.

In this construction, however, the following problems were experienced.

That is, while moving the lower hook downward, the pressure drive wheel may contact with the cover of the operation lever which covers its outside and side surfaces, and the rotation may be stopped momentarily. As a result, the pressure drive wheel moves toward the friction member side above the drive shaft to press against the friction member, which may cause to stop the rotation of the drive shaft. And the lower hook can no longer move downward. Hence, to lower the lower hook further downward, it is necessary to repeat the same operation from the beginning, which was very time-consuming and inconvenient.

To eliminate this inconvenience, it is necessary to hold the cover of operation lever tightly on the brake cover to cover the reverse rotation preventive wheel without any play, and for this purpose, the wall thickness of the fitting part of the both must be increased, and the operation lever must be kept at high precision so as not to incline toward the brake cover and must be also coupled in a reciprocable manner. In such a case, high precision machining was needed in the processing of the fitting parts, and it took time and labor, and the manufacturing cost was raised.

BRIEF SUMMARY OF THE INVENTION

In the light of the above problems, it is hence a primary object of this invention to present a novel lever type hoisting machine capable of securely and easily pulling down the lower hook in no-load state while solving the above problems.

It is another object of this invention to present a lever type hoisting machine capable of moving the lower hook continuously to a desired position if the rotation is momentarily stopped due to contact of the pressure drive wheel with the cover of the operation lever, by changing over the rotating direction change pawl in the neutral position in the no-load state, rotating the operation wheel rotatably held with respect to the drive shaft in the hoisting-down direction, and then pulling down the lower hook.

In the construction of the lever type hoisting machine of this machine, a load sheave is coupled to a drive shaft by way of a transmission gear train, a pressure bearing member is fixed to said drive shaft, a pressure drive wheel is screwed into the threaded part of said drive shaft opposite to said pressure bearing member, the engaging relation of said pressure drive wheel is composed so as to come closer in the direction of said pressure bearing member when rotating in the hoisting-up direction of the pressure drive wheel, a reverse rotation preventive wheel is inserted rotatably in one direction between said pressure drive wheel and pressure bearing member, friction members are disposed at both sides of said reverse rotation preventive wheel, an operation lever is coupled to said pressure drive wheel in a detachable manner by way of a rotation direction change pawl, an operation wheel is rotatably supported on said drive shaft in contact with the pressure drive wheel, a regulating member is held on said drive shaft in contact with the opposite side of the pressure drive wheel of said operation wheel in a movable manner only in the axial direction of said drive shaft, an inside collision part is disposed at the pressure drive wheel side part of said operation wheel, and an outside collision part is disposed at the opposite side part of the pressure drive wheel, a collision wall capable of being engaged with the inside collision part of said operation wheel is formed on said pressure drive wheel, and a collision element capable of being engaged with the outside collision part of the operation wheel is formed on said regulating member, in which said inside collision part is disposed at the side of rotating the pressure drive wheel in the hoisting-down direction with respect to said collision wall, and said collision element is disposed at the side of rotating the operation wheel in the hoisting-down direction with respect to the outside collision part.

These and other objects and features of this invention will be understood and appreciated more clearly by reference to the detailed description made in conjunction with the accompanying drawings and novel items indicated in the claims.

BRIEF DESCRIPTION OF THE DRAWINGS

FIG. 3(*b*) is a front view showing the relation between the inside collision part of the operation wheel and collision wall of the pressure drive wheel in FIG. 3(*a*);

FIG. 4(*b*) is a front view showing the engaging relation between the inside collision part of the operation wheel and collision wall of the pressure drive wheel in FIG. 4(*a*);

DETAILED DESCRIPTION OF THE PREFERRED EMBODIMENT

Figure 1:
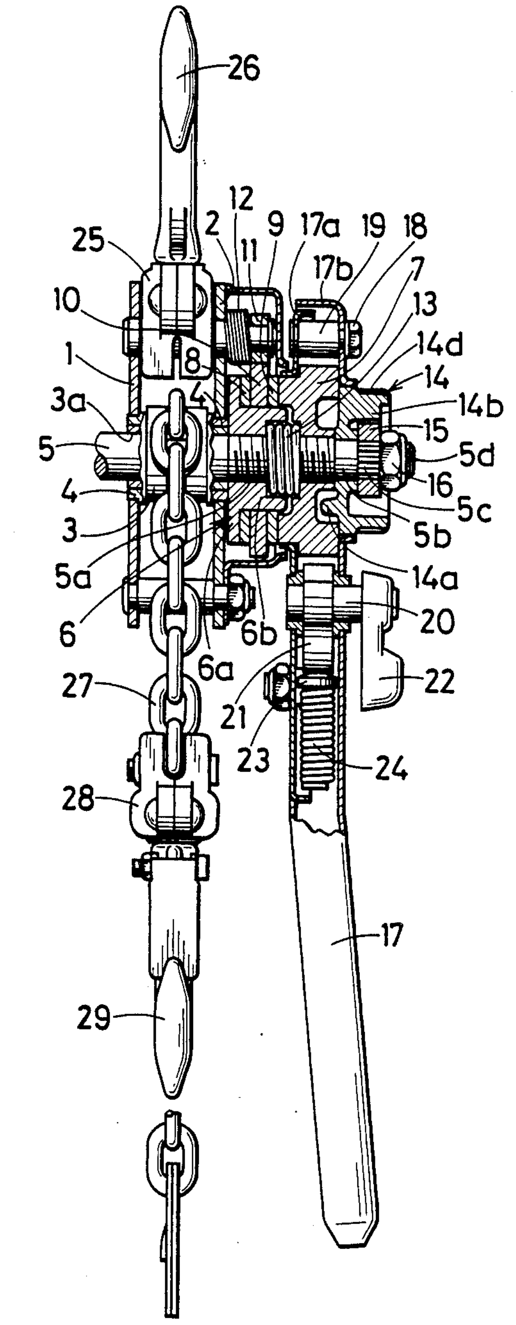
FIG. 1 is a longitudinal sectional view to show the lever type hoisting machine in one of the embodiments of this invention.

In FIG. 1, in the middle of side plates 1, 2 held parallel at a specified interval, a load sheave 3 is rotatably supported by bearings 4, 4. In the center of the radial direction of the load sheave 3, a shaft hole 3*a* is provided, and a drive shaft 5 is penetrated in this shaft hole 3*a*.

Figure 6:
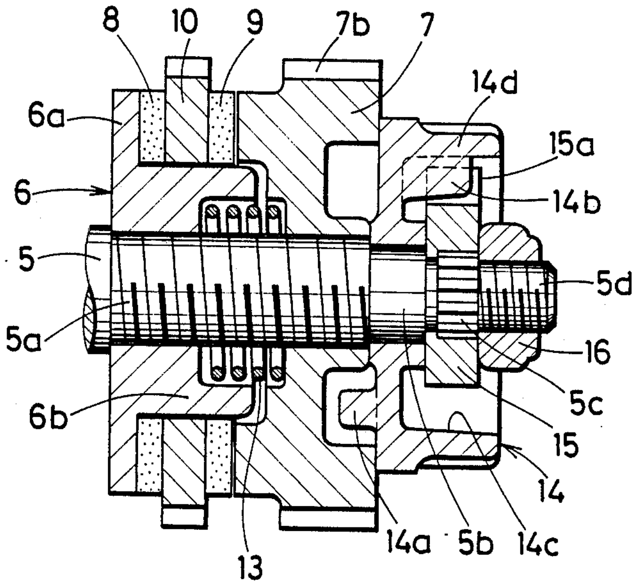
FIG. 6 is a magnified view of essential parts of the lever type hoisting machine shown in FIG. 1.

The both ends of the drive shaft 5 are projected out of said load sheave 3, and on the outside of one of the projecting ends, first threaded part 5*a*, columnar part 5*b*, spline part 5*c*, and second threaded part 5*d* are sequentially formed from the base end side, that is, from the side closer to the side plate 2. As shown in FIG. 6, the diameter of said columnar part 5*b* is slightly smaller than the diameter at the bottom of the first threaded part 5*a*, and is equal to or slightly larger than the outside diameter of the spline part 5*c*. The outside diameter of said second threaded part 5*d* is same as or slightly smaller than the diameter of the bottom of the spline part 5*c*.

At the other projecting end of the drive shaft 5, there is a pinion shaft which is not shown, and it is designed so that the load sheave 3 may be rotated and driven by way of a known reduction gear train which is engaged with this pinion gear.

In the first threaded part 5*a* of said drive shaft 5, a pressure bearing member 6 and a pressure drive wheel 7 are screwed from the base end side.

Said pressure bearing member 6 is composed of a disc part 6*a* and a boss part 6*b* projecting from the middle of its radial direction, and the disc part 6*a* is fixed in the deepest part of the first threaded part 5*a* so as to be closer to the side plate 2. On the outside of said boss part 6*b*, a pair of friction members 8, 9 and a reverse rotation preventive wheel 10 held by said pair of friction members 8, 9 are inserted.

Said reverse rotation preventive wheel 10 has detent teeth inclined in one direction. The reverse rotation preventive wheel 10 and the friction members 8, 9 disposed at its both sides are pressed against the disc part 6*a* of said pressure bearing member 6 by means of pressure drive wheel 7.

Numeral 11 is a ratchet pawl, and it is pivoted on said side plate 2 and is pressed in the direction of the reverse rotation preventive member 10 by means of spring 12. This ratchet pawl 11 is engaged with detent teeth 10*a* of the reverse rotation preventive wheel 10, thereby holding the reverse rotation preventive wheel 10 to be rotatable only in the hoisting-up direction of the load sheave 3.

Between a hole formed in the end of the boss part 6*b* of said pressure bearing member 6 and the opposing pressure drive wheel 7, a thrust member 13 for thrusting the pressure drive wheel 7 outward is inserted.

Figure 5:
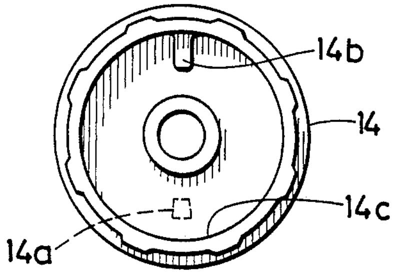
FIG. 5(*a*), (*b*) are front view and longitudinal sectional view of the operation wheel.
Figure 5:
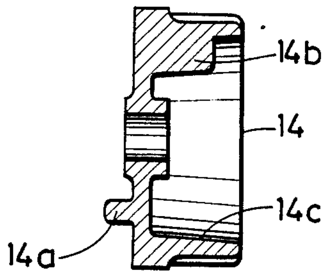

Adjacently to the end side of said pressure drive wheel 7, an operation wheel 14 is rotatably supported on the columnar part 5*b* of the drive shaft 5. This operation wheel 14 has an inside collision part 14*a* disposed as the side opposite to the pressure drive wheel 7, and an outside collision part 14*b* at the reverse side of the pressure drive wheel 7 (see FIG. 5 and FIG. 6). Said inside collision part 14*a* and outside collision part 14*b* are formed at opposite sides of the drive shaft 5 on the diameter line of the operation wheel 14. Besides, at the front side end of the pressure drive wheel 7 opposing to the operation wheel 14, a collision wall 7*a* which can be engaged with the inside collision part 14*a* is formed.

Figure 3:
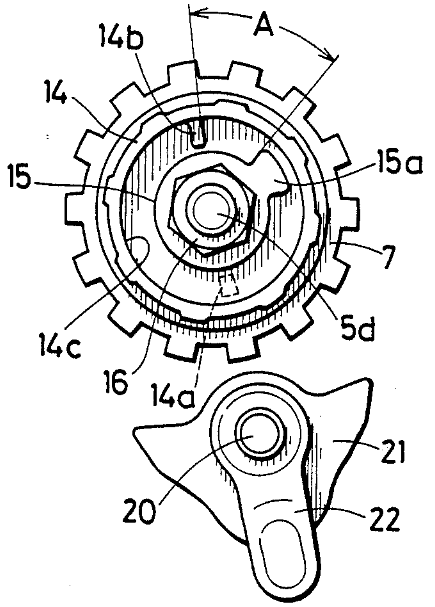
FIG. 3(*a*) is a front view showing the relative relation of the pressure drive wheel, operation wheel and regulating member of the same lever type hoisting machine, when rotating the operation wheel in the hoisting-down direction when pulling down the lower hook.
Figure 3:
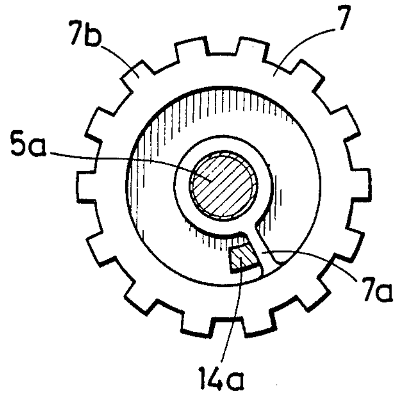

The outside collision part 14*b* is disposed so as to project outward in the radial direction from the inside of the circular hole 14*c* provided at the front side end of the operation wheel 14. Inside this circular hole 14*c*, a regulating member 15 for adjusting the allowable angle until collision is provided, and this regulating member 15 is fitted with the spline part 5*c* of the drive shaft 5. On the outside of the regulating member 15, as shown in FIG. 3, a collision member 15*a* is formed, and this collision member 15*a* is designed to collide against the outside collision part 14*b* of the operation wheel 14.

The inside collision part 14*a* of the operation wheel 14 is disposed at the side to collide when the pressure drive wheel 7 is rotated in the hoisting-down direction with respect to the collision wall 7*a*, and the collision element 15*a* of said regulating member 15 is disposed as the side to collide when the operation wheel 14 is rotated in the hoisting-down direction with respect to the outside collision part 14*b*.

When the pressure drive wheel 7 is rotated in the hoisting-up direction and the reverse rotation preventive wheel is completely pressed and moreover the inside collision part 14*a* of the operation wheel 14 abuts against the hoisting-up direction side face of the collision wall 7*a* of the pressure drive wheel 7, the collision element 15*a* of the regulating member 15 is disposed at the hoisting-up direction side of the outside collision part 14*b* of the operation wheel 14, and is located at a slightly remote position.

Therefore, when the operation wheel 14 is rotated in the hoisting-down direction, the pressure drive wheel 7 is rotated in the direction of departing from the pressure bearing member 6 by way of the collision wall 7*a* that is engaged with the inside collision part 14*a*, and when the pressure drive wheel 7 is momentarily stopped in rotation due to contact with the covers 17*a*, 17*b* of the operation lever 17 and is rotated in the hoisting-up direction, the collision element 15*a* of the regulating member 15 which rotates together with the drive shaft 5 collides against the outside collision part 14*b* of the operation wheel 14 which is rotatably held by the drive shaft 5, and as a result of this impact, the operation wheel is rotated in the hoisting-down direction, and collides against the collision wall 7*a* of the pressure drive wheel 7, which causes the pressure drive wheel 7 to rotate in the direction to depart from the pressure bearing member 6.

Numeral 16 is a nut, and it is screwed into the second threaded part 5*d* of the drive shaft 5. This nut 16 prevents the operation wheel 14 or regulating member 15 from being dislocated from the drive shaft 5.

The pressure drive wheel 7 has the part of gear 7*b* formed on its outside house in the operation lever 17. This operation lever 17 is composed of separately formed inside lever case 17*a* and outside lever case 17*b*.

The inside lever case 17*a* has an opening through which the pressure drive wheel 7 is inserted. The outside lever case 17*b* is integrally coupled with the inside lever case 17*a* by means of a plurality of screws 18 and nuts 19. The outside lever case 17*b* has an opening which contacts with the operation handle part 14*d* of the operation wheel 14, at a position corresponding to the operation handle 14*b*.

Inside the operation lever 17 extended beneath the pressure drive wheel 7 is accommodated a rotation direction change pawl 21. This rotation direction change pawl 21 is rotatably held on the both lever cases 17*a*, 17*b* on a shaft 20. This shaft 20 is projected outside from the operation lever 17, and a handle 22 is attached to this projecting part, and said rotating direction change pawl 21 can be changed over by this handle 22. By the changeover operation, the rotating direction change pawl 21 is engaged with the gear 7*b* of the pressure drive wheel 7 so as to rotate the pressure drive wheel 7 either in the hoisting-up or hoisting-down direction, or may be held in the neutral position where the pressure drive wheel 7 is not rotated in any direction.

Numeral 23 is a pressure member for thrusting the lower end of the rotating direction change pawl 2 upward by a spring 24, and this pressure member 23 keeps the rotating direction change pawl 21 changed over to a specified position by said handle 22 in its state.

Besides, above said side plates 1, 2, an upper hook 26 is disposed by way of a connector 25, while a lower hook 29 for suspending the load is coupled to the lower end of the load chain 27 wound on the load sheave 3 by way of a connector 28. Numeral 30 is a load fixing piece, and is pivoted on the upper part of the lower hook 29 to be rotatable only inside.

The operation and effect of the action of this embodiment are explained below.

Figure 2:
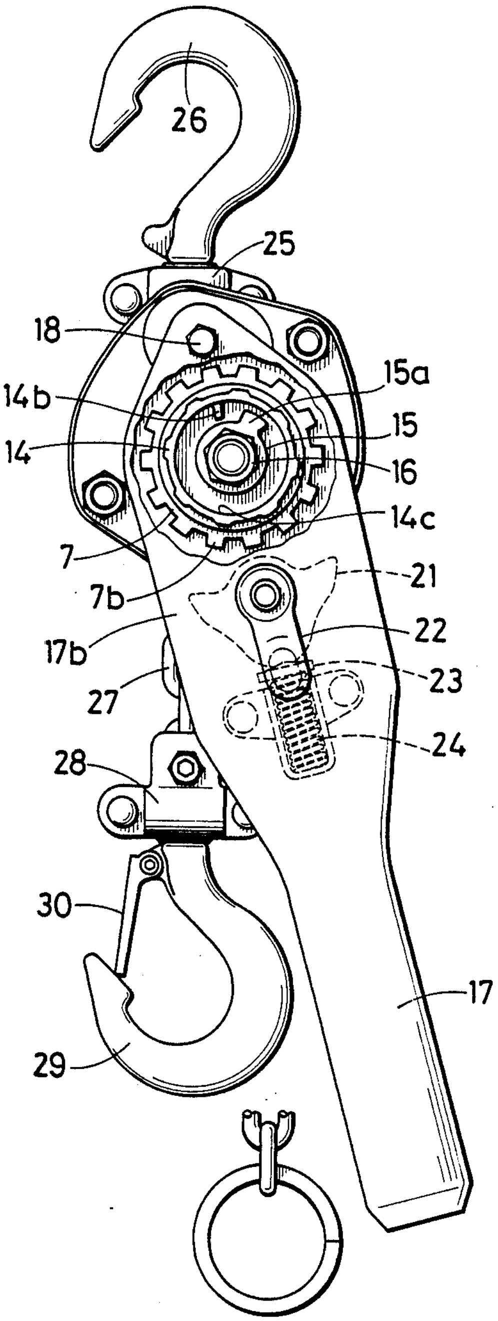
FIG. 2 is a side elevation of the same lever type hoisting maching, showing with a partially cut-away cover of the operation lever.

A. Hoisting-up operation:

After changing over the rotating direction change pawl 21 from the neutral position shown in FIG. 1 and FIG. 2 to rotate the pressure drive wheel 7 in the hoisting-up direction, by rotating the operation lever 17 reciprocally, the load sheave 3 intermittently rotates in the hoisting-up direction, and the lower hook 29 is hoisted up.

That is, when the operation lever 17 is rotated reciprocally, the pressure drive wheel 7 is rotated in the hoisting-up direction, and moves above the first threaded part 5*a* of the drive shaft 5 toward the pressure bearing member 6 side while turning spirally, and it finally presses against the disc part 6*a* of the pressure bearing member 6 of the reverse rotation preventive wheel 10.

Thus, the rotating force of the pressure drive wheel 7 is transmitted to the pressure bearing member 6 by way of the intervening frictional force (by friction plates 9, 8), and is further sent to the drive shaft 5. In consequence, the drive shaft 5 rotates in the hoisting-up direction while being prohibited in the reverse rotation by the action of the reverse rotation preventive wheel 10, and the load sheave 3 is intermittently rotated in the hoisting-up direction, and the load suspended on the lower hook 29 is hoisted up gradually.

B. Hoisting-down operation:

(1) When loaded:

Contrary to the above case, after changing over the rotating direction change pawl 21 from the neutral position shown in FIG. 1 and FIG. 2 to the hoisting-down direction, by reciprocally rotating the operation lever 17, the load sheave 3 rotates intermittently in the hoisting-down direction, so that the lower hook 9 is hoisted down.

That is, when the operation lever 17 is turned reciprocally, the pressure drive wheel 7 moves in the direction to depart from the pressure bearing member 6 on the first threaded part 5*a*, and, as a result, it no longer presses the reverse rotation preventive wheel 10 against the disc part 6*a* of the pressure bearing member 6, and the pressure bearing member 6 is cleared from the braking action by the reverse rotation preventive wheel 10.

Thus, the drive shaft 5 and the pressure bearing member 6 fixed thereon are rotated in the hoisting-down direction by the weight of the load suspended on the lower hook 29.

On the other hand, since the rotating direction change pawl 21 is held by the spring 24, the pressure drive wheel 7 is prohibited in the rotation in the hoisting-down direction more than rotated by the operation lever 17, so that the rotation of the drive shaft 5 is allowed only in the rate of the pressure drive wheel 7 rotated in the hoisting-down direction by the operation lever 17.

Therefore, the rotation of the drive shaft 5 in the hoisting-down direction is intermittently stopped, and the load suspended on the lower hook 29 is gradually hoisted down.

(2) When unloaded:

In no-load state without any load suspended on the lower hook 29, when it is desired to pull down the lower hook 29 quickly, the rotating direction change pawl 21 is changed to the neutral position, and the operation wheel 14 is rotated in the hoisting-down direction, and the lower hook 29 is pulled down.

That is, when the operation wheel 14 is rotated in the hoisting-down direction, as shown in FIG. 3, the inside collision part 14*a* of the operation wheel 14 collides against the collision wall 7*a*, and the pressure drive wheel 7 is rotated in the hoisting-down direction. As a result, the pressure drive wheel 7 is moved in the direction departing from the pressure bearing member 6, and the braking force by the pressure drive wheel 7 acting on the drive shaft is released.

Therefore, in this state, when the lower hook 29 is pulled down, the load sheave 3 is exempted from the action of said braking force, and is rotated in the hoisting-down direction, so that the downward move of the lower hook 29 may be effected quickly in continuous state.

Besides, while the lower hook 29 is moving down, if the pressure drive wheel 7 is momentarily stopped in rotation due to contact with the lever cases 17*a*, 17*b* of the operation lever 17, the downward move of the lower hook 29 will never be blocked.

Figure 4:
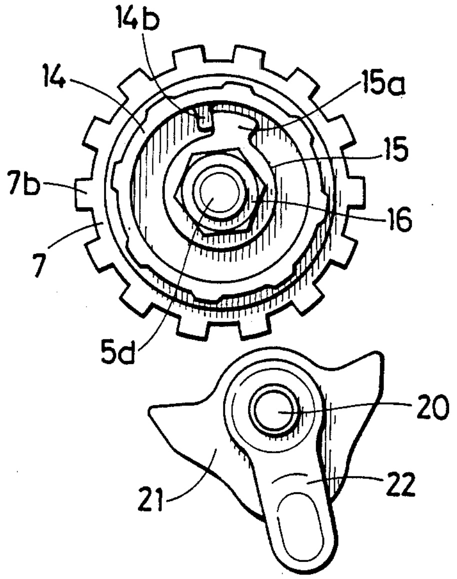
FIG. 4(*a*) is a front view showing the state of rotating the operation wheel in the hoisting-down direction by the regulating member when pulling down the lower hook in the same lever type hoisting machine.
Figure 4:
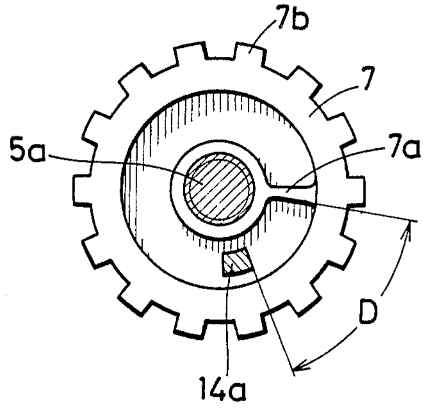

That is, if the pressure drive wheel 7 contacts with the lever cases 17*a*, 17*b* of the operation lever 17 to stop rotation momentarily while the lower hook 29 is moving down, the pressure drive wheel 7 is moved in the direction toward the pressure bearing member 6 by the drive shaft 5 which is rotating in the hoisting-down direction, and a braking force is about to act on the rotation of the drive shaft 5. At this time, however, the collision element 15*a* of the regulating member 15 rotating in the hoisting-down direction integerally with the drive shaft collides against the outside collision part 14a of the operation wheel 14 as shown in FIG. 4, and the operation wheel 14 is rotated again in the hoisting-down direction. As a result, the inside collision part 14a of the operation wheel 14 impulsively collides against the collision wall 7*a* of the pressure drive wheel 7, so that the pressure drive wheel 7 is rotated again in the hoisting-down direction.

Therefore, since the pressure drive wheel 7 is cleared of the braking action before acting on the drive shaft 5, the lower hook 29 can be also pulled down quickly in continuous state, too.

As illustrated and described herein, according to this invention, by changing the rotating direction change pawl in the neutral position in the no-load state and rotating the operation wheel held rotatably with respect to the drive shaft in the hoisting-down direction, and pulling down the lower hook, whether the pressure drive wheel contacts with the cover of the operation lever to stop the rotation momentarily or not, the lower hook can be moved quickly to a desired position in continuous state.

Meanwhile, the practical embodiment described herein is intended only to illustrate the technical features of this invention, and hence this invention is not limited to the above embodiment alone, but should be interpresented in a wider sense of meaning so as to be embodied in different forms within the true spirit and scope of the claims appended herein.

What is claimed is:

1. A lever type hoisting machine in a structure wherein:

a load sheave is linked to a drive shaft having a threaded part a pressure bearing member is fixed to said drive shaft, and a pressure drive wheel is screwed into the threaded part of the drive shaft opposite to said pressure bearing member;

the engaging relation of said pressure drive wheel is composed so as to approach the direction of said pressure bearing member when the pressure drive wheel is rotated in the hoisting-up direction;

a reverse rotation preventive wheel is inserted between said pressure drive wheel and pressure bearing member having means rendering the same rotatable only in one direction, and friction members are disposed at both sides of said reverse rotation preventive wheel;

an operation lever is linked to said pressure drive wheel detachably by way of a rotating direction change pawl;

an operation wheel is rotatably supported on said drive shaft at a position disposing one side adjacent to the pressure drive wheel;

a collision force regulating member is held on said drive shaft adjacently at the opposite side of said operation wheel;

said pressure drive wheel having a side part and said operation wheel has an inside collision part disposed at the pressure drive wheel side part and an outside collision part at the opposite side part of the pressure drive wheel;

a collision wall capable of being engaged with the inside collision part of said operation wheel is formed on said pressure drive wheel;

a collision element capable of being engaged with the outside collision part of said operation wheel is formed on said regulating member; and said inside collision part is disposed at the side of rotating the pressure drive wheel in the hoisting-down direction with respect to the collision wall, while the collision element is disposed at the side of rotating the operation wheel in the hoisting-down direction with respect to the outside collision part, wherein the central angle of the gap, formed by the outside collision part and collision element of the regulating member when the inside collision part is contacting with the collision wall of the pressure drive wheel having a central angle is set so as to be slightly smaller than the central angle of the gap formed by the inside collision part and the collision wall when the collision element is contacting with the outside collision part.

2. A lever type hoisting member according to claim 1, wherein said pressure bearing member is screwed and fixed to the threaded part of said drive shaft.

3. A lever type hoisting machine according to claim 1, wherein said reverse rotation preventive wheel is indirectly mounted on said drive shaft.

4. A lever type hoisting machine according to claim 1, wherein said pressure drive wheel is thrust in the direction of departing from said pressure bearing member by means of a thrusting member.

5. A lever type hoisting machine according to claim 1, wherein said pressure bearing member is composed of disc part and boss part, and said reverse rotation preventive wheel is rotatably mounted on said boss part to be rotatable only in one direction.

6. A lever type hoisting machine according to claim 1, a gear which is detachably engaged with said rotating direction change pawl and converts the reciprocal motion of said operation lever into rotating motion is formed on the outside of said pressure drive wheel.

7. A lever type hoisting machine according to claim 1, wherein said inside collision part is disposed at the side of the pressure drive wheel side of said operation wheel, and the outside collision part is disposed at the side of the opposite side of the pressure drive wheel of said operation wheel.

8. A lever type hoisting machine according to claim 1, wherein a circular hole is formed in said operation wheel, and said regulating member is formed in this circular hole, and said collision member is formed on the outside of said regulating member.

* * * * *